United States Patent [19]

Sivyer

[11] Patent Number: 4,510,343

[45] Date of Patent: Apr. 9, 1985

[54] THERMOWELL APPARATUS

[76] Inventor: Robert B. Sivyer, 1314 Beutel Dr., Houston, Tex. 77055

[21] Appl. No.: 598,052

[22] Filed: Apr. 9, 1984

[51] Int. Cl.³ .......................................... H01L 35/02
[52] U.S. Cl. ..................................... 136/242; 136/230; 374/208
[58] Field of Search ................ 136/230, 242; 374/179, 374/208

[56] References Cited

U.S. PATENT DOCUMENTS

| 3,556,864 | 1/1971 | Wagner | 136/230 |
| 3,913,058 | 10/1975 | Nishio et al. | 136/230 |
| 4,162,929 | 7/1979 | Finney | 136/230 |

Primary Examiner—Ben R. Padgett
Assistant Examiner—T. J. Wallen

[57] ABSTRACT

A thermowell apparatus for sensing temperatures in the fluid flow in a petrochemical furnace including a housing externally welded to a pipe or fitting and adapted to enclose a removable tip member of high alloy material and a removable thermocouple.

9 Claims, 2 Drawing Figures

THERMOWELL APPARATUS

FIELD OF THE INVENTION

This invention relates to temperature sensing and support means for use in petrochemical furnaces and more particularly to removable thermowells and thermocouples in the support piping in a furnace.

PRIOR ART

Prior art known to applicant are U.S. Pat. Nos. 3,911,747 and 4,324,945.

BACKGROUND OF THE INVENTION

In the processing of gas, oil or kerosene to other petrochemicals, the liquid is fed into piping which passes through a heated furnace and exits as a gas. The piping in the furnace typically is tortuously arranged in a vertical plane and supported from the roof of the furnace. One or more temperature sensing devices are used to sense the temperature of the fluids in the pipes for regulation of the input temperature of the fluid and the rate of flow of fluids through the pipe. Heretofore, the temperature sensing device or thermowell has typically consisted of a tube with a closed end where the closed end is inserted through a hole in a return bend of the pipe or furnace tube and welded in place so that the closed end tip of the tube extends approximately to a center point of the internal diameter of the pipe. An electrical thermocouple is then inserted into the tube for sensing temperature. The thermocouple consists of two wires of dissimilar metals in a ceramic sheath and covered by a high alloy metal sheath. The tube provides a housing to protect the thermocouple from damage in the high temperature environment.

One of the problems involved with temperature sensing devices or thermowells is their replacement with respect to the piping after a considerable period of usage. As a practical matter, replacement of the temperature sensing device should be as simple as possible so that repair and costs are reduced or minimized.

THE PRESENT INVENTION

The present invention includes a tubular thick-walled housing which is permanently welded to the outside of a pipe. A thermowell tube with a closed end is adapted to be received in the housing and extend through an opening in the pipe so that the tip of the tube extends to the approximate center point of the internal diameter of the pipe. A cap member is adapted to close the exterior open end of the housing and lock the tube in position within the housing. The cap member and housing are then seal welded together. A thermocouple is insertable through an end opening in the cap member. The housing and cap member are constructed of materials and have a wall configuration to minimize changes due to temperature effects and withstand the environmental temperature. The thermocouple may be replaced when desired without removing the housing on the pipe.

DESCRIPTION OF THE INVENTION

Figure 1:
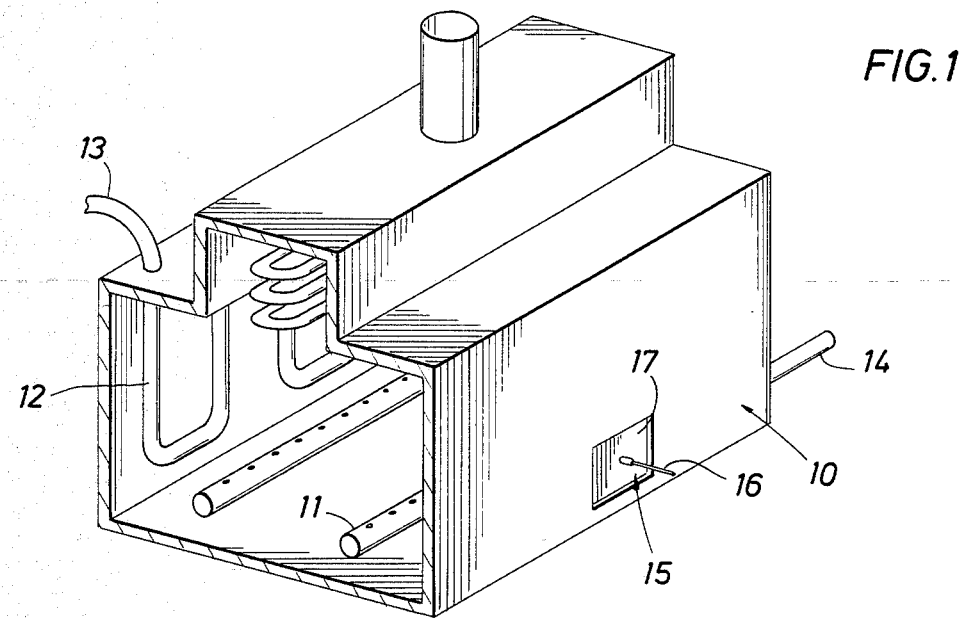
In FIG. 1, a section of a petrochemical furnace in which the present invention is embodied is illustrated.

As shown in FIG. 1, an enclosed furnace housing 10 has a heating means 11 and a fluid flow pipe 12 which extends through the furnace from an inlet 13 to an outlet 14. The flow pipe 12 typically is disposed in a vertical plane and is arranged by a series of reversed "U" bends in the housing to provide a long flow path through the furnace. There may be serveral levels of the pipe to achieve the desired heating of fluid in the pipe 12. For illustration, only one thermowell 15 is shown in FIG. 1 although there can be any number of thermowells. As shown in FIG. 1, only the thermocouple 16 extends through an opening in an access door 17 to the furnace. The access door 17 is removable and the thermowell does not extend to the exterior of the furnace. Thus, the effects of the exterior environment are isolated from the thermowell.

Figure 2:
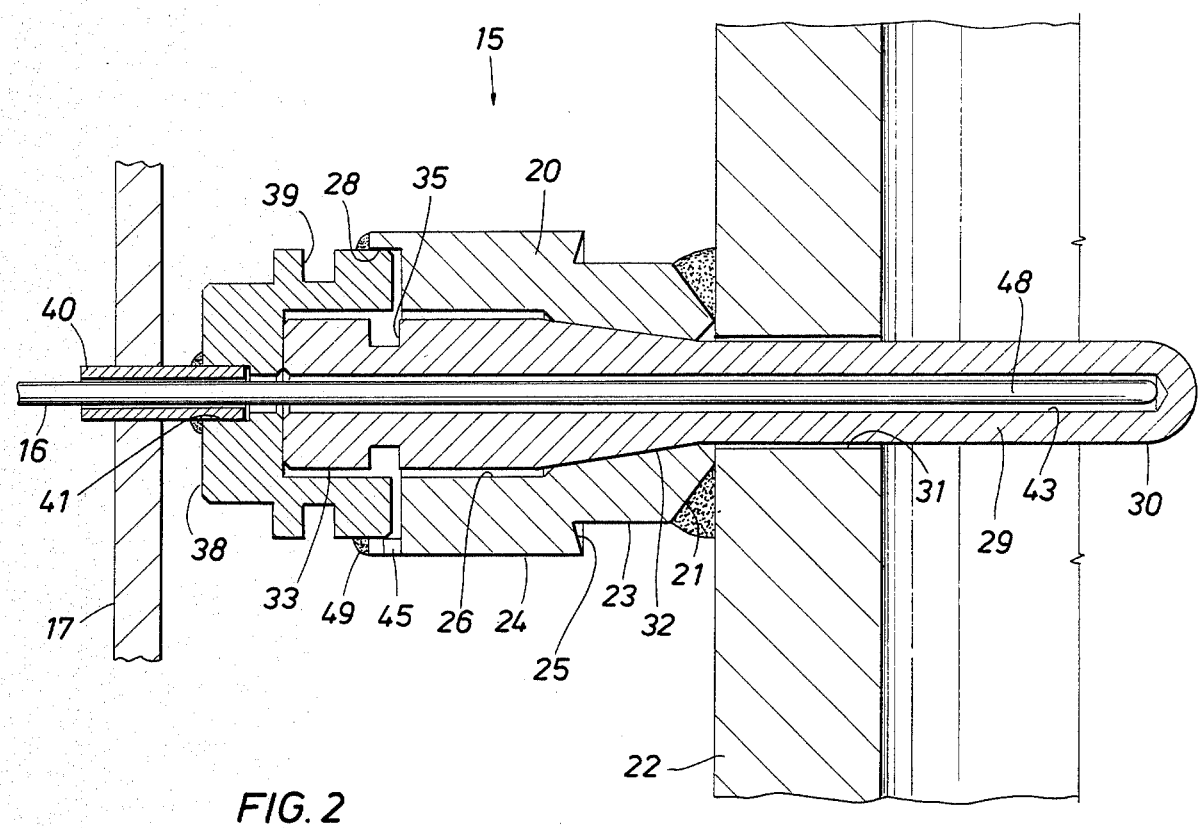
FIG. 2 illustrates in cross section, a thermowell embodying the present invention.

Referring now to FIG. 2, a tubular outer housing member 20 has a beveled end 21 which facilitates welding of the housing member 20 to the wall 22 of a pipe or fitting. The housing member 20 has its central axis perpendicular to the central axis of the pipe or fitting and has stepped outer diameter portions 23, 24 which form an annular shoulder 25 which faces toward the pipe or fitting. The housing member 20 has a central intermediate bore 26 which joins a frusto-conical bore 27 at one end and an outer enlarged diameter bore 28 at the other end. A vent hole 45 is provided between one cap member 38 and housing member 20.

A tubular insert housing member 29 has an end portion 30 designed to be received in an opening 31 as the pipe or fitting wall, an intermediate outer tapered portion 32 to seat in the frusto-conical bore 27 of the housing member 20 and a cylindrically shaped outer end portion 33 sized to be received in the intermediate bore 26 of the housing member. When the insert housing member 29 is disposed in the outer housing member 20 the end portion 30 projects to the center of the pipe and the outer end portion 33 projects outwardly of the outer housing member 20. An annular groove 35 is provided in the insert housing member 29 at a location just forward of the flange in the outer housing member 20 when the insert housing member is in the outer housing member. A cylindrical shaped cap member 38 is sized to be received in the outer bore 28 of the outer housing member 20 and to be welded to the outer housing member 20. An annular clamping groove 39 is provided midway of the length of cap member 38. A tubular crimping tube 40 is welded in place in a center counter bore 41 in the end of the cap. The bore of the tube 40 aligns with the bore 43 in the tubular member 29. A vent hole 45 is provided in the cap member 38 to equalize pressure and temperature.

In the present invention, tubular housing 29, tube 40, housing member 20, insert housing member 20 and cap member 38 are made of heat resisting alloy. The use of the same material minimizes temperature effects.

For installation, an access door 17 is cut in the furnace and the flow pipe or fitting drilled to provide opening 31. Housing member 23 is then welded to the pipe wall 22. Insert housing 29 is then installed and the cap member 38 inserted into the bore 28. The groove 39 in the cap member and the shoulder 25 provide a means for producing compression of the insert housing member 29 in the frusto-conical bore 27. While clamped, the cap member 38 is seal welded at 49 to the outer housing member 20. Next, the thermocouple 48 is inserted through the tube 40 and the tube 40 secures the thermocouple 48 in place. The thermocouple is a cylindrically shaped member which has thermocouple wires embedded in ceramic and enclosed in a high allow tubular member.

To remove the thermocouple 48, it is only necessary to remove the door 17 and to grind off the cap weld 49 and apply an extraction tool to the groove 35 in the insert housing member 29. A new housing member 29 can then be substituted. In this procedure the seal weld 49 is the only affected weld in the replacement of the insert housing member 29.

In the event the tip of the housing member 29 erodes, which is common, then the tube 40, which extends to outside of the door 17, would flash with a flame. The end of the tube 40 can be crimped to stop the flare which avoids a complete shutdown of the furnace.

While only selected embodiments of the present invention are illustrated and described herein, other embodiments of the invention are contemplated and many changes and modifications of the inventions may be made within the scope of the appended claims without departing from the spirit of the invention.

I claim:

1. A thermowell apparatus for sensing temperature in a flow pipe in a petrochemical furnace including,
   a tubular housing member adapted to be welded to the outer wall of a pipe for use in a cracking furnace, said housing member having a bore aligned with an opening in the wall of a pipe, said bore in said housing member having a frusto-conical section.,
   a tubular, closed end insert member having an outer frusto-conical surface adapted to engage the frusto-conical section of the housing member with the closed end of the insert member extended midway into a pipe;
   a closure member adapted to close the open end of said housing member and enclose the insert member within said housing member; and
   said closure member having a central opening for insertion of a thermocouple into the interior of the insert member and being removably welded to said housing member with a seal weld.

2. The apparatus as set forth in claim 1 wherein said housing member has internal stepped diameter portions for providing a recess for receiving said closure member.

3. The apparatus as set forth in claim 2 wherein said closure member and said housing member have shoulder means constructed and arranged for cooperation with clamping means for compressing the frusto-conical surface of the insert member on the frusto-conical section of the housing member prior to application of a seal weld.

4. The apparatus as set forth in claim 1 wherein said insert member has a portion thereof which extends outwardly from said housing member and has shoulder means in said portion for assisting in removal of the insert member from the housing member and said closure member has an internal recess for receiving said portion.

5. The apparatus as set forth in claim 1 wherein said closure member has a tubular extension for insertion through the wall of a furnace door.

6. A thermowell apparatus for sensing temperature in a flow pipe in a petrochemical furnace including,
   a tubular housing member having one end thereof adapted to be welded to the outer wall of a pipe for use in a cracking furnace and having its other end having a recess for receiving a closure member, said housing member having a bore aligned with an opening in the wall of a pipe, said bore in said housing member having a frusto-conical section adjacent to said one end;
   a tubular, closed end insert member having an outer frusto-conical surface adapted to engage the frusto-conical section of the housing member with the closed end of the insert member extended midway into a pipe and the open end extended outwardly of the housing member where the portion of the insert member extending outwardly of the housing member has shoulder means for assisting in removal of an insert member from a housing member;
   a closure member adapted to be received in the recess in the housing member for closing the open end of said housing member and enclosing the insert member within said housing member; and
   said closure member having a central opening for insertion of a thermocouple into the interior of the insert member and being removably welded to said housing member with a seal weld.

7. The apparatus as set forth in claim 5 wherein said closure member and said housing member have shoulder means constructed and arranged for cooperation with clamping means for compressing the frusto-conical surface of the insert member on the frusto-conical section of the housing member prior to application of a seal weld.

8. The apparatus as set forth in claim 6 wherein said closure member has a tubular extension for insertion through the wall of a furnace door.

9. The apparatus as set forth in claim 6 wherein there are vent means to the interior of the housing member between the frusto-conical section of the housing member and the closure member.

* * * * *